(12) United States Patent
Iwasaki et al.

(10) Patent No.: US 10,522,866 B2
(45) Date of Patent: Dec. 31, 2019

(54) FUEL CELL STACK AND FUEL CELL SYSTEM

(71) Applicant: Nissan Motor Co., Ltd., Kanagawa (JP)

(72) Inventors: Daigo Iwasaki, Kanagawa (JP);
Hidetaka Nishimura, Kanagawa (JP);
Hayato Chikugo, Kanagawa (JP);
Ryoichi Shimoi, Kanagawa (JP); Keiji Ichihara, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 750 days.

(21) Appl. No.: 14/377,740

(22) PCT Filed: Feb. 5, 2013

(86) PCT No.: PCT/JP2013/052604
§ 371 (c)(1),
(2) Date: Aug. 8, 2014

(87) PCT Pub. No.: WO2013/118719
PCT Pub. Date: Aug. 15, 2013

(65) Prior Publication Data
US 2016/0013509 A1    Jan. 14, 2016

(30) Foreign Application Priority Data

Feb. 9, 2012   (JP) .................................. 2012-026272
Aug. 6, 2012   (JP) .................................. 2012-174187

(51) Int. Cl.
*H01M 8/2483*    (2016.01)
*H01M 8/04119*   (2016.01)
(Continued)

(52) U.S. Cl.
CPC ..... *H01M 8/2483* (2016.02); *H01M 8/04156* (2013.01); *H01M 8/04171* (2013.01);
(Continued)

(58) Field of Classification Search
CPC ............ H01M 8/2415; H01M 8/2485; H01M 8/2484; H01M 2008/1095;
(Continued)

(56) References Cited

U.S. PATENT DOCUMENTS 6,416,899 B1      7/2002  Wariishi et al.
2004/0023090 A1*  2/2004  Pearson ............. H01M 8/0247
                                                            429/432
(Continued)

FOREIGN PATENT DOCUMENTS

JP    2000-149977 A    5/2000
JP    2001-118596 A    4/2001
(Continued)

OTHER PUBLICATIONS

International Search Report issued in PCT/JP2013/052604 dated Apr. 2, 2013 (4 pages).
(Continued)

*Primary Examiner* — Milton I Cano
*Assistant Examiner* — Philip A. Stuckey
(74) *Attorney, Agent, or Firm* — Osha Liang LLP

(57) ABSTRACT

A fuel cell stack obtained by stacking a plurality of fuel cells has an internal manifold that extends in a stacking direction of the fuel cells to externally discharge a gas used in the fuel cell, and an extension member that adjoins an inner wall surface of the internal manifold and extends in the stacking direction. The extension member is a bar-shaped member provided in an opposite side to a side where a gas from the fuel cells flows to the inside of the internal manifold and has
(Continued)

a sloping surface making an acute angle with an inner-wall lower surface of the internal manifold.

6 Claims, 22 Drawing Sheets

(51) Int. Cl.
 *H01M 8/2485* (2016.01)
 *H01M 8/2484* (2016.01)
 *H01M 8/242* (2016.01)
 *H01M 8/1018* (2016.01)
 *H01M 8/04291* (2016.01)

(52) U.S. Cl.
 CPC ........ *H01M 8/04291* (2013.01); *H01M 8/242* (2013.01); *H01M 8/2484* (2016.02); *H01M 8/2485* (2013.01); *H01M 2008/1095* (2013.01)

(58) Field of Classification Search
 CPC ......... H01M 8/04156; H01M 8/04291; H01M 8/04171; H01M 8/242; H01M 8/2483
 See application file for complete search history.

(56) References Cited

U.S. PATENT DOCUMENTS

| | | | |
|---|---|---|---|
| 2004/0202911 A1 | 10/2004 | Komura et al. | |
| 2012/0122008 A1* | 5/2012 | Ko | H01M 8/04089 429/458 |
| 2013/0017468 A1* | 1/2013 | Kim | H01M 8/2465 429/452 |
| 2013/0202976 A1* | 8/2013 | Chikugo | H01M 8/04089 429/414 |

FOREIGN PATENT DOCUMENTS

| | | |
|---|---|---|
| JP | 2005-209526 A | 8/2005 |
| JP | 2006-066131 A | 3/2006 |
| JP | 2006-147503 A | 6/2006 |
| JP | 2006-202524 A | 8/2006 |
| WO | 2012/081333 A1 | 6/2012 |

OTHER PUBLICATIONS

Written Opinion of the International Searching Authority issued in PCT/JP2013/052604 dated Apr. 2, 2013 (4 pages).

* cited by examiner

FUEL CELL STACK AND FUEL CELL SYSTEM

CROSS-REFERENCE TO RELATED APPLICATIONS

This application is based on and claims priority to Japanese Patent Application Laid-open Nos. 2012-26272 (filed in Japan Patent Office on Feb. 9, 2012) and 2012-174187 (filed in Japan Patent Office on Aug. 6, 2012), the entire content of which is incorporated herein by reference.

BACKGROUND

Technical Field

The present invention relates to a fuel cell stack configured by stacking a plurality of fuel cells and a fuel cell system having the fuel cell stack.

Related Art

A fuel cell is formed by interposing an electrolyte membrane between an anode and a cathode. The fuel cell generates electric power using a hydrogen-containing anode gas supplied to the anode and an oxygen-containing cathode gas supplied to the cathode. An electrochemical reaction occurring between the anode and the cathode can be expressed as follows.

$$\text{Anode: } 2H_2 \rightarrow 4H^+ + 4e^- \quad (1)$$

$$\text{Cathode: } 4H^+ + 4e^- + O_2 \rightarrow 2H_2O \quad (2)$$

Through the electrochemical reactions (1) and (2), the fuel cell generates an electromotive force of approximately 1 V.

When such a fuel cell is employed in a vehicle power supply system, several hundreds of fuel cells are stacked and used in the form of a fuel cell stack because a vehicle consumes large power. In addition, a fuel cell system is provided to supply the fuel cell stack with an anode gas and a cathode gas so that power for driving a vehicle is extracted.

In JP 2006-66131 A, there is discussed a fuel cell stack having an internal manifold as a path for flowing the anode gas or the cathode gas. Such an internal manifold is provided as a path by connecting through-holes formed in the fuel cell in a fuel-cell stacking direction.

Produced water produced at the time of power generation and the like flows to a discharge-side internal manifold for discharging the anode gas and the cathode gas to the outside of the fuel cell stack. As the produced water stays in the inside of the discharge-side internal manifold and returns to a reaction surface (active area), power generation performance of the fuel cell stack is degraded. For this reason, the discharge-side internal manifold is preferably configured to easily discharge the produced water.

SUMMARY OF INVENTION

However, in the fuel cell stack discussed in the JP 2006-66131 A, if each of the stacked fuel cells is not accurately positioned, unevenness is formed in the inside of the internal manifold when the fuel cell stack is assembled. This unevenness may disadvantageously hinder a flow of the produced water in the stacking direction.

In view of the above, there is a need for a fuel cell stack capable of improving performance of discharging the produced water in the stacking direction inside the internal manifold.

According to an aspect of the invention, there is provided a fuel cell stack obtained by stacking a plurality of fuel cells, including: an internal manifold that extends in a stacking direction of the fuel cells to externally discharge a gas used in the fuel cell; and an extension member that adjoins an inner wall surface of the internal manifold and extends in the stacking direction.

The foregoing and additional features and characteristics of this disclosure will become more apparent from the following detailed description considered with the reference to the accompanying drawings.

DETAILED DESCRIPTION

Embodiments of the present invention will be described below with reference to the attached drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
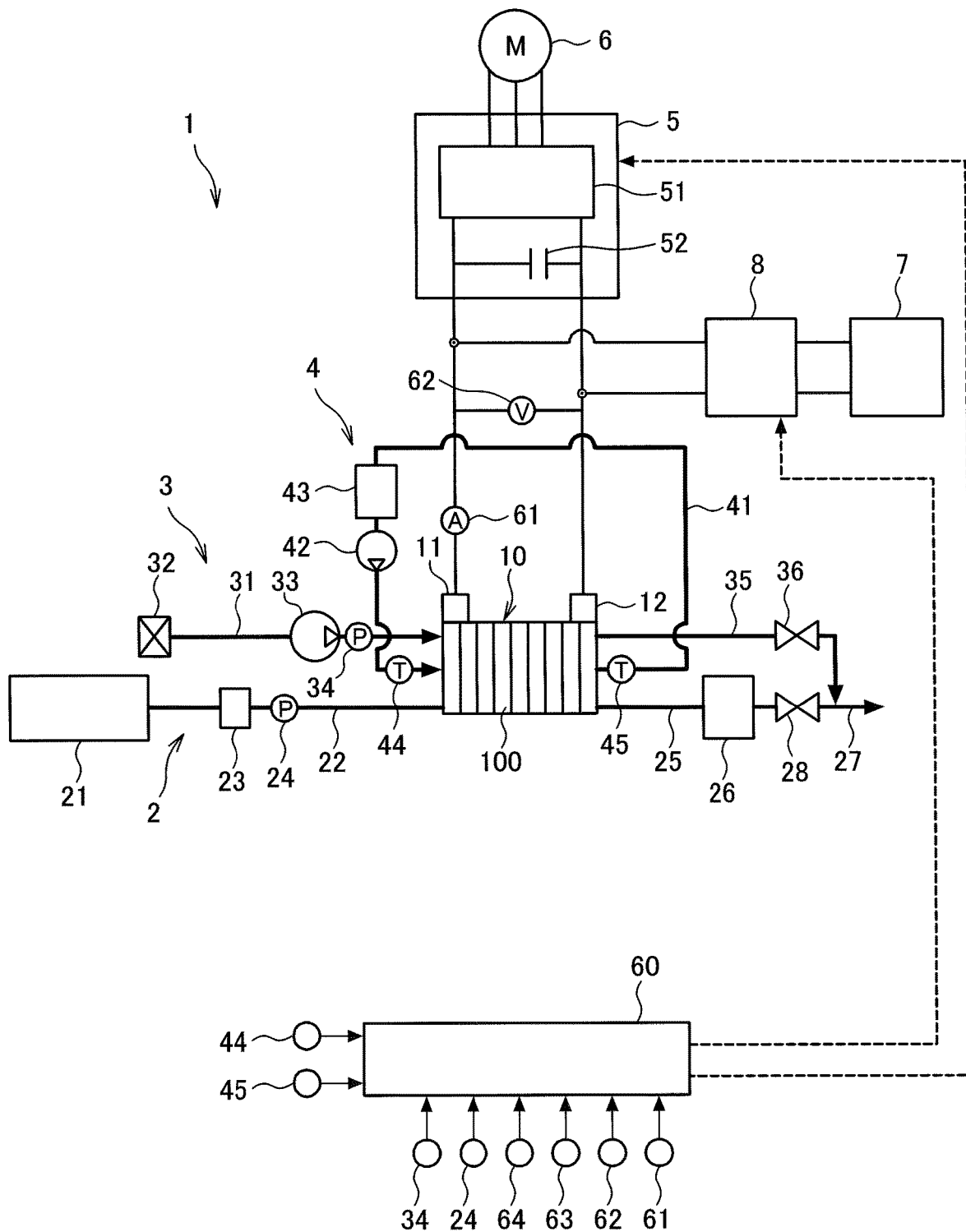
FIG. 1 is a schematic block diagram illustrating a fuel cell system having a fuel cell stack according to a first embodiment of the invention.

FIG. 1 is a schematic block diagram illustrating a fuel cell system 1 having a fuel cell stack 10 according to a first embodiment of this disclosure.

The fuel cell system 1 includes a fuel cell stack 10, an anode gas supply unit 2, a cathode gas supply unit 3, a cooler unit 4, an inverter 5, a drive motor 6, a battery 7, a DC/DC converter 8, and a controller 60.

The fuel cell stack 10 is formed by stacking a predetermined number of fuel cells 100 as a unit cell. The fuel cell stack 10 is laid transversely while the fuel cells 100 are stacked in a horizontal direction. The fuel cell stack 10 is supplied with hydrogen as an anode gas and the air as a cathode gas to generate electric power and supply the electric power to various electric components such as a drive motor 6 for driving a vehicle. The fuel cell stack 10 has an anode-side terminal 11 and a cathode-side terminal 12 as an output terminal for extracting the electric power.

The anode gas supply unit 2 includes a high-pressure reservoir 21, an anode gas supply path 22, a pressure regulator valve 23, a pressure sensor 24, an anode gas discharge path 25, a buffer reservoir 26, a purge path 27, and a purge valve 28.

The high-pressure reservoir 21 is a container for containing and reserving the anode gas supplied to the fuel cell stack 10 in a high pressure state.

The anode gas supply path 22 is a path for supplying the anode gas discharged from the high-pressure reservoir 21 to the fuel cell stack 10. One end of the anode gas supply path 22 is connected to the high-pressure reservoir 21, and the other end is connected to an anode gas inlet port of the fuel cell stack 10.

The pressure regulator valve 23 is an electronic valve capable of adjusting an opening level continuously or stepwise and is installed in the anode gas supply path 22. The pressure regulator valve 23 regulates the high-pressure anode gas discharged from the high-pressure reservoir 21 to a predetermined pressure. The opening level of the pressure regulator valve 23 is controlled by the controller 60.

The pressure sensor 24 is provided in the anode gas supply path 22 in the downstream side from the pressure regulator valve 23. The pressure sensor 24 detects a pressure of the anode gas flowing through the anode gas supply path 22. The pressure of the anode gas detected by the pressure sensor 24 represents a pressure of the entire anode system including the buffer reservoir 26, the anode gas flow path inside the fuel cell stack 10, and the like.

The anode gas discharge path 25 is a path that connects the fuel cell stack 10 and the buffer reservoir 26. One end of the anode gas discharge path 25 is connected to the anode gas outlet port of the fuel cell stack 10, and the other end is connected to the top portion of the buffer reservoir 26. A mixture of gases (hereinafter, referred to as an "anode off-gas") including a surplus anode gas not contributing to the electrochemical reaction and an impurity gas including nitrogen, water vapor, and the like leaking from the cathode side to the anode gas flow path inside the fuel cell stack 10 is discharged to the anode gas discharge path 25.

The buffer reservoir 26 is a container temporarily reserving the anode off-gas flowing through the anode gas discharge path 25. A part of water vapor included in the anode off-gas is condensed into condensed water in the buffer reservoir 26 and is separated from the anode-off gas.

The purge path 27 is a discharge path for causing the buffer reservoir 26 to communicate with the outside. One end of the purge path 27 is connected to a bottom portion of the buffer reservoir 26, and the other end of the purge path 27 is formed as an opening end. The anode off-gas reserved in the buffer reservoir 26 is diluted with a cathode off-gas flowing from a cathode gas discharge path 35 described below to the purge path 27 and is discharged to the outside from the opening end of the purge path 27 along with the condensed water.

The purge valve 28 is an electronic valve capable of adjusting an opening level continuously or stepwise and is installed in the purge path 27. A flow rate of the anode off-gas discharged to the outside from the purge path 27 is regulated by adjusting the opening level of the purge valve 28. The opening level of the purge valve 28 is controlled by the controller 60.

The cathode gas supply unit 3 includes a cathode gas supply path 31, a filter 32, a compressor 33, a pressure sensor 34, a cathode gas discharge path 35, and a pressure regulator valve 36.

The cathode gas supply path 31 is a path for flowing the cathode gas supplied to the fuel cell stack 10. One end of the cathode gas supply path 31 is connected to the filter 32, and the other end is connected to the cathode gas inlet port of the fuel cell stack 10.

The filter 32 removes a foreign object such as dirt or dust contained in the air input from the outside. The air obtained by removing a foreign object through the filter 32 serves as the cathode gas supplied to the fuel cell stack 10.

The compressor 33 is installed in the cathode gas supply path 31 between the filter 32 and the fuel cell stack 10. The compressor 33 forcibly transfers the cathode gas received through the filter 32 to the fuel cell stack 10.

The pressure sensor 34 is provided in the cathode gas supply path 31 in the downstream side from the compressor 33. The pressure sensor 34 detects a pressure of the cathode gas flowing through the cathode gas supply path 31. The pressure of the cathode gas detected by the pressure sensor 34 represents a pressure of the entire cathode system including the cathode gas flow path in the fuel cell stack 10 and the like.

The cathode gas discharge path 35 is a path for causing the fuel cell stack 10 and the purge path 27 of the anode gas supply unit 2 to communicate with each other. One end of the cathode gas discharge path 35 is connected to the cathode gas outlet port of the fuel cell stack 10, and the other end is connected to the purge path 27 in the downstream side from the purge valve 28. The cathode gas not contributing to the electrochemical reaction in the fuel cell stack 10 is discharged as a cathode off-gas to the purge path 27 through the cathode gas discharge path 35.

The pressure regulator valve 36 is an electronic valve capable of adjusting the opening level continuously or stepwise and is installed in the cathode gas discharge path 35. The opening level of the pressure regulator valve 36 is controlled by the controller 60 to regulate the pressure of the cathode gas supplied to the fuel cell stack 10.

The cooler unit 4 is a device for cooling the fuel cell stack 10 using a coolant. The cooler unit 4 includes a coolant circulation path 41, a coolant circulation pump 42, a radiator 43, and coolant temperature sensors 44 and 45.

The coolant circulation path 41 is a path where the coolant for cooling the fuel cell stack 10 flows. One end of the coolant circulation path 41 is connected to the coolant inlet port of the fuel cell stack 10, and the other end is connected to the coolant outlet port of the fuel cell stack 10.

The coolant circulation pump 42 is a pumping device for circulating the coolant and is installed in the coolant circulation path 41.

The radiator 43 is a radiating device for cooling the coolant discharged from the fuel cell stack 10 and is installed in the coolant circulation path 41 in the upstream side from the coolant circulation pump 42.

The coolant temperature sensors 44 and 45 are sensors for detecting a temperature of the coolant. The coolant temperature sensor 44 is provided in the coolant circulation path 41 in the vicinity of the coolant inlet port of the fuel cell stack 10 to detect a temperature of the coolant flowing to the fuel cell stack 10. In contrast, the coolant temperature sensor 45 is provided in the coolant circulation path 41 in the vicinity of the coolant outlet port of the fuel cell stack 10 to detect a temperature of the coolant discharged from the fuel cell stack 10.

The inverter 5 has a switch portion 51 and a smoothing capacitor 52 and is electrically connected to the fuel cell stack 10 through the anode-side terminal 11 and the cathode-side terminal 12. The switch portion 51 having a plurality of switching elements converts a DC current to an AC current or an AC current to a DC current. The smoothing capacitor 52 is connected to the fuel cell stack 10 in parallel to suppress a ripple generated through the switching of the switch portion 51 and the like.

The drive motor 6 is a three-phase AC motor. The drive motor 6 is operated by virtue of an AC current supplied from the inverter 5 to generate a torque for driving a vehicle.

The battery 7 is electrically connected to the drive motor 6 and the fuel cell stack 10 through the DC/DC converter 8. The battery 7 is a chargeable/dischargeable secondary battery such as a lithium-ion secondary battery.

The DC/DC converter 8 is electrically connected to the fuel cell stack 10. The DC/DC converter 8 is a bidirectional voltage converter capable of increasing or decreasing a voltage of the fuel cell stack 10. The DC/DC converter 8 obtains a DC output from a DC input and converts an input voltage into an arbitrary output voltage.

The controller 60 is a microcomputer having a central processing unit (CPU), a read-only memory (ROM), a random-access memory (RAM), and an input/output (I/O) interface.

The controller 60 receives signals from an electric current sensor 61 that detects an output current of the fuel cell stack 10, a voltage sensor 62 that detects an output voltage of the fuel cell stack 10, an acceleration pedal sensor 63 that detects a depression level of an acceleration pedal provided in a vehicle, and a battery state-of-charge (SOC) sensor 64 that detects a charge amount of the battery 7 as well as the pressure sensors 24 and 34 or the coolant temperature sensors 44 and 45 in order to detect a driving state of the fuel cell system 1. The controller 60 periodically opens or closes the pressure regulator valve 23 based on these input signals to perform the anode pressure pulsation for periodically increasing or decreasing the anode pressure.

In the case of an anode dead-end type fuel cell stack 1 in which the anode off-gas does not circulate to the anode gas supply path 22, as the anode gas is continuously supplied to the fuel cell stack 10 from the high-pressure reservoir 21 while the pressure regulator valve 23 is opened, the anode off-gas is continuously discharged to the outside, so that the anode gas contained in the anode off-gas is consumed wastefully. In this regard, the fuel cell system 1 periodically opens or closes the pressure regulator valve 23 to perform an anode pressure pulsation, which causes the anode off-gas reserved in the buffer reservoir 26 to flow backward to the fuel cell stack 10 at the time of anode pressure decompression. As a result, it is possible to reuse the anode gas contained in the anode off-gas and reduce the amount of the anode gas discharged to the outside.

Figure 2:
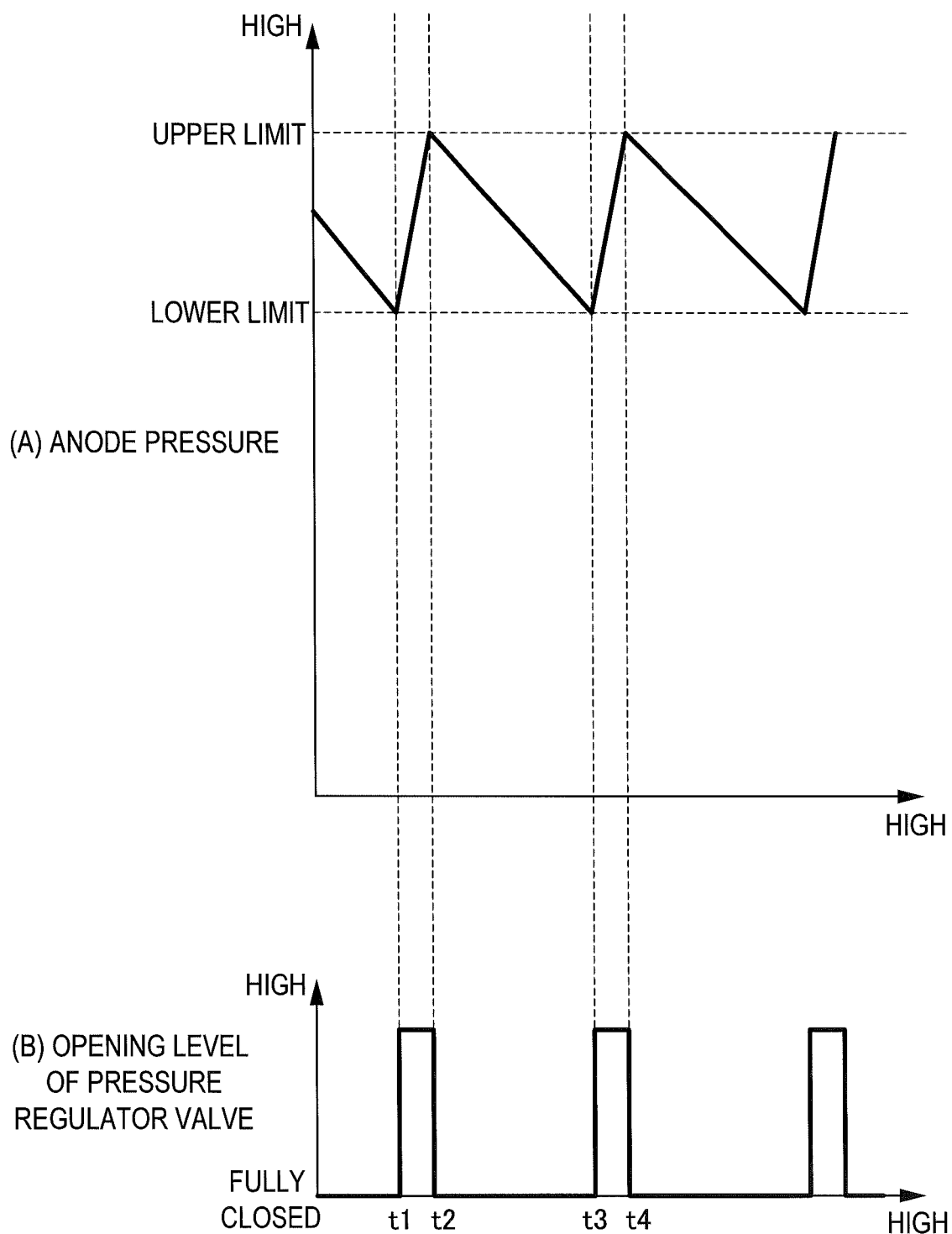
FIG. 2 is a timing chart illustrating an anode pressure pulsation operation in the fuel cell system.

FIG. 2 is timing charts illustrating an anode pressure pulsation during a normal operation of the fuel cell system 1.

As illustrated in (A) of FIG. 2, the controller 60 computes a target output power of the fuel cell stack 10 depending on a vehicle travel state and sets upper and lower limit values of the anode gas supply pressure (anode pressure) based on the target output power. In addition, the controller 60 periodically changes the anode pressure between the set upper and lower limit values of the anode pressure.

Specifically, as the anode pressure reaches the lower limit value at timing t1, the pressure regulator valve 23 is opened at an opening level by which the anode pressure can increase at least up to the upper limit value as illustrated in (B) of FIG. 2. In this state, the anode gas is supplied from the high-pressure reservoir 21 to the fuel cell stack 10, and the anode off-gas is discharged to the buffer reservoir 26.

As the anode pressure reaches the upper limit value at timing t2, the pressure regulator valve 23 is fully closed to stop supply of the anode gas from the high-pressure reservoir 21 to the fuel cell stack 10 as illustrated in (B) of FIG. 2. Through the electrochemical reaction described above, the anode gas remaining in the anode gas flow path inside the fuel cell stack 10 is consumed as time elapses. Accordingly, the anode pressure decreases as much as the amount of the consumed anode gas.

As the anode gas inside the fuel cell stack 10 is consumed at a certain level, the pressure of the buffer reservoir 26 becomes temporarily higher than the pressure of the anode gas flow path of the fuel cell stack 10. Therefore, the anode off-gas flows backward from the buffer reservoir 26 to the fuel cell stack 10. As a result, the anode gas remaining in the anode gas flow path of the fuel cell stack 10 and the anode gas contained in the anode off-gas flowing backward from the buffer reservoir 26 are consumed as time elapses.

As the anode pressure reaches the lower limit value at timing t3, the pressure regulator valve 23 is opened as in timing t1. In addition, as the anode pressure reaches the upper limit value at timing t4, the pressure regulator valve 23 is fully closed. If the pressure regulator valve 23 is periodically opened or closed in this manner, the anode pressure pulsation is performed, and the anode gas contained in the anode off-gas is reused.

Figure 3:
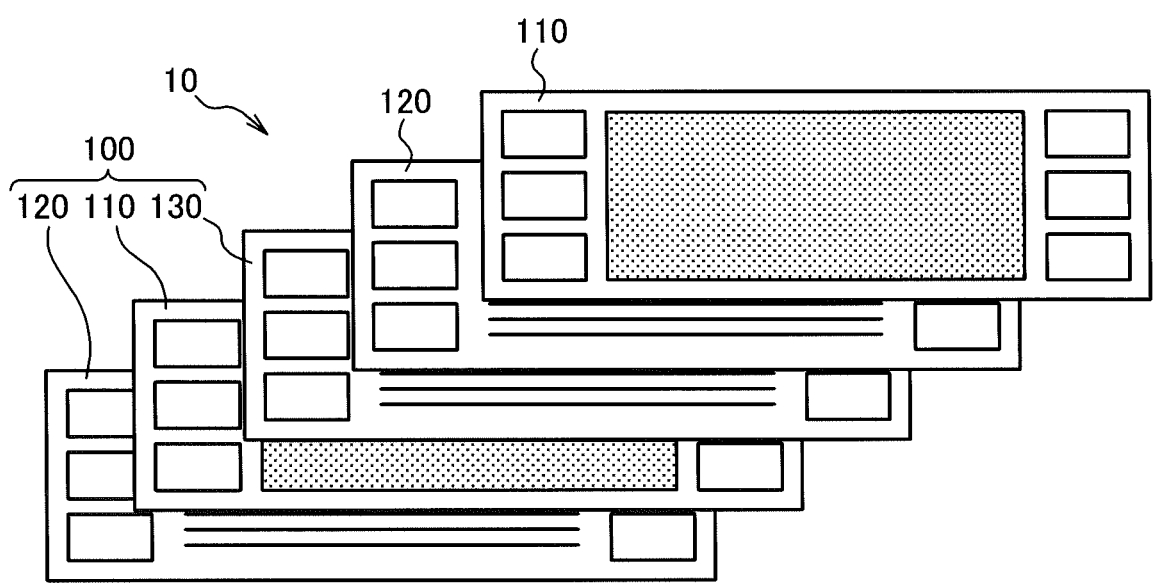
FIG. 3 is an exploded diagram illustrating the fuel cell stack.
Figure 4A:
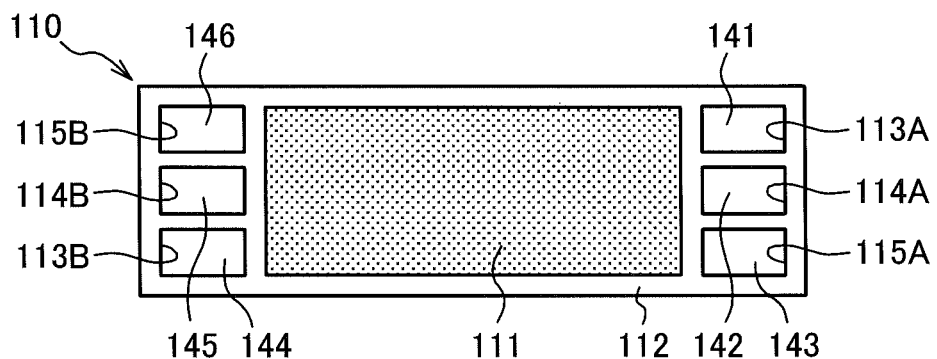
FIG. 4A is a front view illustrating a membrane electrode assembly.
Figure 4B:
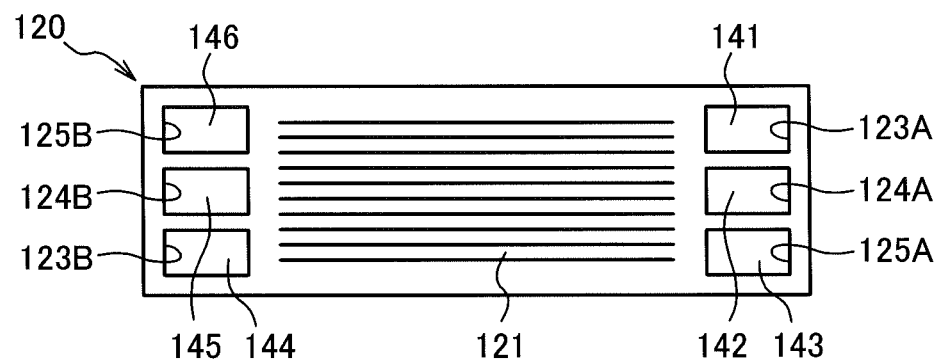
FIG. 4B is a front view illustrating an anode separator.
Figure 4C:
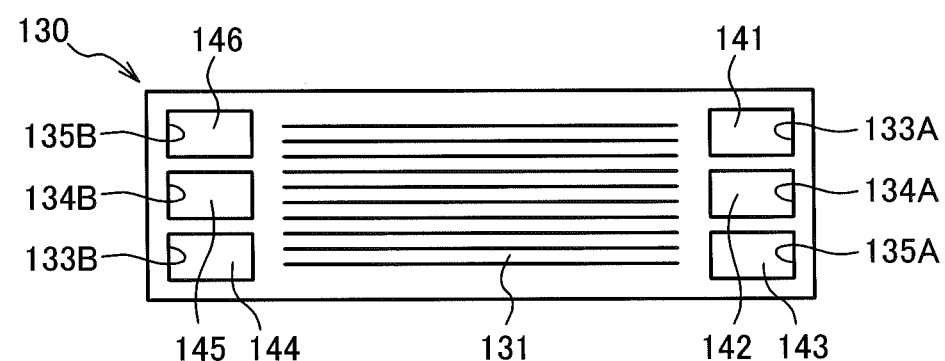
FIG. 4C is a front view illustrating a cathode separator.
Figure 5:
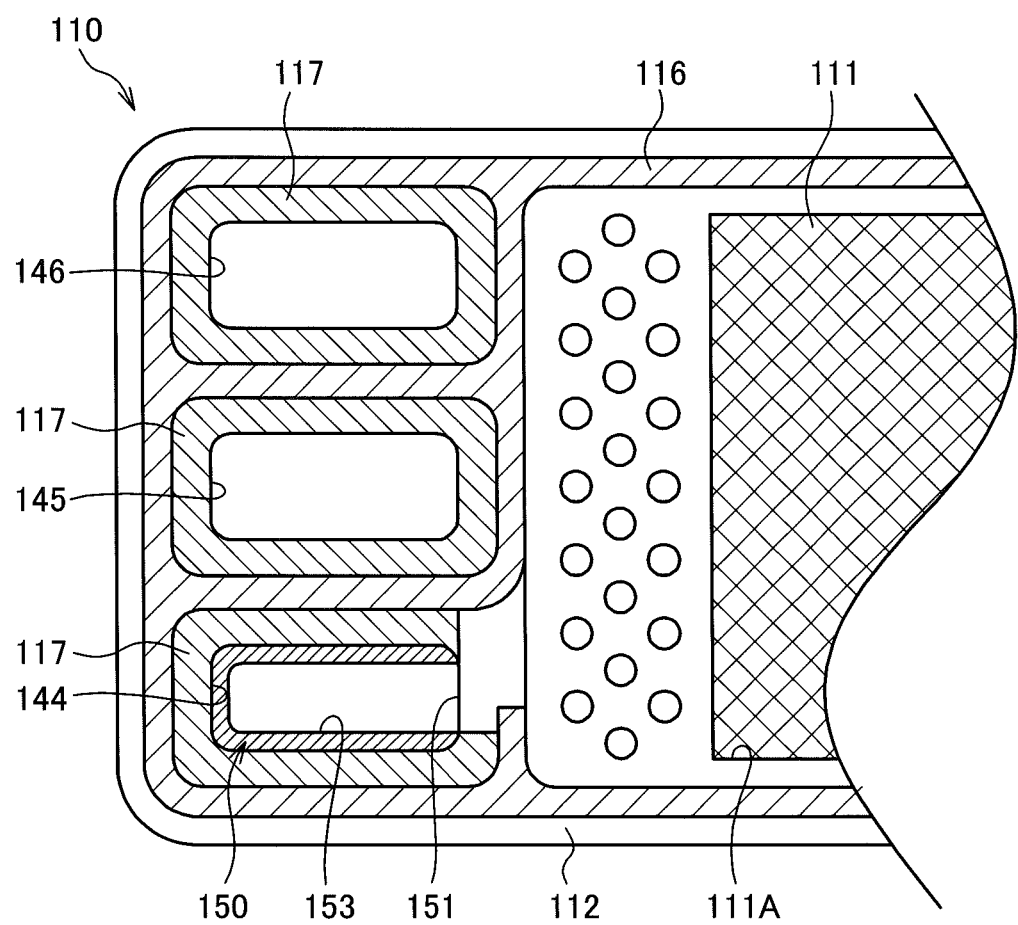
FIG. 5 is an enlarged view illustrating a vicinity of the discharge-side internal manifold of the membrane electrode assembly.

Next, a description will be made for a configuration of the fuel cell stack 10 with reference to FIGS. 3, 4A to 4C, and 5. FIG. 3 is an exploded view illustrating the fuel cell stack 10. FIG. 4A is a front view illustrating a membrane electrode assembly (MEA) 110. FIG. 4B is a front view illustrating the anode separator 120. FIG. 4C is a front view illustrating the cathode separator 130. FIG. 5 is an enlarged view illustrating the vicinity of the internal manifolds 144 to 146 in the discharge side of the MEA 110.

As illustrated in FIG. 3, the fuel cell stack 10 is formed by stacking a plurality of fuel cells 100, each of which includes the MEA 110, an anode separator 120, and a cathode separator 130. In the fuel cell 100, the anode separator 120 is arranged on one surface of the MEA 110, and the cathode separator 130 is arranged on the other surface.

As illustrated in FIG. 4A, the MEA 110 includes a layered product 111 in which an anode is arranged on one surface of the electrolyte membrane, and a cathode is arranged on the other surface, and a frame portion 112 formed in the outer circumferential edge of the layered product 111.

The frame portion 112 of the MEA 110 is a frame member formed of a synthetic resin and the like and is formed integratedly with the outer periphery of the layered product 111. In the frame portion 112 of one end side (right side in the drawing), an anode gas supply hole 113A, a coolant supply hole 114A, and a cathode gas supply hole 115A are formed in this order from the top. In addition, in the frame portion 112 of the other end side (left side in the drawing), a cathode gas discharge hole 115B, a coolant discharge hole 114B, and an anode gas discharge hole 113B are formed in this order from the top.

As illustrated in FIG. 4B, the anode separator 120 is a plate-shaped member formed of a conductive material such as metal. The anode separator 120 forms an anode gas flow path 121 for flowing the anode gas to the surface of the MEA 110 side and a coolant flow path (not illustrated) for flowing the coolant to the surface opposite to the MEA 110 side.

In one end side of the anode separator 120, an anode gas supply hole 123A, a coolant supply hole 124A, and a cathode gas supply hole 125A are formed in this order from the top. In addition, in the other end side of the anode separator 120, a cathode gas discharge hole 125B, a coolant discharge hole 124B, and an anode gas discharge hole 123B are formed in this order from the top.

As illustrated in FIG. 4C, the cathode separator 130 is a plate-shaped member formed of a conductive material such as metal. The cathode separator 130 forms a cathode gas flow path 131 for flowing the cathode gas to the surface of the MEA 110 side and a coolant flow path (not illustrated) for flowing the coolant to the surface opposite to the MEA 110 side.

In one end side of the cathode separator 130, an anode gas supply hole 133A, a coolant supply hole 134A, and a cathode gas supply hole 135A are formed in this order from the top. In addition, in the other end side of the cathode separator 130, a cathode gas discharge hole 135B, a coolant discharge hole 134B, and an anode gas discharge hole 133B are formed in this order from the top.

When the fuel cell stack 10 is formed by stacking the fuel cells 100, the anode gas supply holes 113A, 123A, and 133A are connected to each other in the stacking direction to form an anode gas supply internal manifold 141, the coolant supply holes 114A, 124A, and 134A are connected to each other in the stacking direction to form a coolant supply internal manifold 142, and the cathode gas supply holes 115A, 125A, and 135A are connected to each other to form a cathode gas supply internal manifold 143. Similarly, the anode gas discharge holes 113B, 123B, and 133B are connected to each other in the stacking direction to form an anode gas discharge internal manifold 144, the coolant discharge holes 114B, 124B, and 134B are connected to each other in the stacking direction to form a coolant discharge internal manifold 145, and the cathode gas discharge holes 115B, 125B, and 135B are connected to each other in the stacking direction to form a cathode gas discharge internal manifold 146.

As illustrated in FIG. 5, on the front and rear surfaces of the MEA 110, a seal member 116 is provided to surround the outer periphery of the MEA 110 and each of the internal manifolds 141 to 146. In a gap between the seal member 116 and each of the internal manifolds 141 to 146, an adhesive 117 for bonding the MEA 110 to the anode separator 120 and the cathode separator 130 is filled. The seal member 116 and the adhesive 117 are provided except for a portion for allowing the gas or the like to access each of the internal manifolds 141 to 146. The seal member 116 and the adhesive 117 prevent the gas or the coolant flowing through each of the internal manifolds 141 to 146 from leaking from the fuel cell stack 10.

In this manner, inside of the fuel cell stack 10, the internal manifolds 141 to 146 extending in the stacking (horizontal) direction of the fuel cells 100 are formed, so that the anode gas, the cathode gas, and the coolant are supplied to each of the fuel cells 100 through the internal manifolds 141 to 143, and the anode gas, the cathode gas, and the coolant are discharged from each of the fuel cells 100 through the internal manifolds 144 to 146.

However, in the fuel cell stack 10, the produced water produced at the time of generation of electricity power and the like flows to the discharge-side internal manifolds 144 and 146 that discharge the anode gas and the cathode gas to the outside. In particular, in the anode dead-end type fuel cell stack 10 as in this embodiment, the produced water is easily gathered in the discharge-side internal manifold 144 which discharges the anode gas to the outside. As the produced water is gathered in the anode gas discharge-side internal manifold 144, the power generation performance of the fuel cell stack 10 may be degraded due to a decrease of the anode gas flow rate and the like.

In this regard, in the fuel cell stack 10 according to this embodiment, an extension member 150 extending in the stacking direction is arranged in the discharge-side internal manifold 144 which discharges the anode gas to the outside in order to improve produced-water discharge performance.

Figure 6:
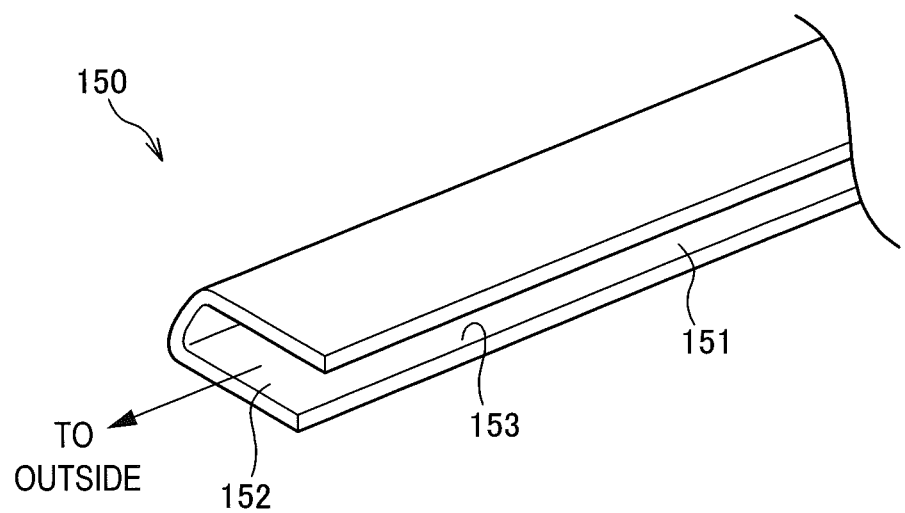
FIG. 6 is a perspective view illustrating an extension member provided in the internal manifold of the fuel cell stack.

A description will now be made for the extension member 150 with reference to FIGS. 5 and 6. FIG. 5 is an enlarged view illustrating the vicinity of the discharge-side internal manifolds 144 to 146 of the MEA 110. FIG. 6 is a perspective view illustrating the extension member 150.

As illustrated in FIGS. 5 and 6, the extension member 150 is a cylindrical member having an approximately U-shaped cross section and is formed of an insulative resin material. The extension member 150 may be formed of a metal material. However, in this case, a surface of the member is insulatively coated.

In the lateral side of the extension member 150 positioned in the inside of the width direction of the fuel cell stack 10, an inlet port 151 for inputting the gas is formed. In addition, in one side end of the longitudinal direction of the extension member 150, an outlet port 152 for discharging the gas flowing from the inlet port 151 to the outside of the fuel cell stack 10 is formed. The inner wall surface of the extension member 150 is formed evenly so as not to hinder a flow of the gas or the produced water in the stacking direction of the fuel cells 100.

The extension member 150 is arranged inside the internal manifold 144 while the outer wall surface of the extension member 150 adjoins the inner wall surface of the anode gas discharge-side internal manifold 144. In this manner, since the extension member 150 is arranged to abut on the inner wall surface of the internal manifold 144, the extension member 150 serves as a member for positioning each fuel cell 100 when the fuel cell stack 10 is assembled. It is noted that, while the extension member 150 is installed inside the internal manifold 144, the inner-wall lower surface 153 of the extension member 150 is positioned to be higher than the lower end position 111A of the layered product 111 (active area) of the MEA 110 (refer to FIG. 5).

A part of the produced water produced in the power generation and the anode gas that is not used in the power generation flow to the inside of the extension member 150 arranged inside the internal manifold 144 through the inlet port 151. Since the extension member 150 is a member extending in the stacking direction of the fuel cells 100, the produced water flowing to the inside of the extension member 150 smoothly flows to the downstream side along with the flow of the anode gas, passes through the outlet port 152, and is then discharged to the outside of the fuel cell stack 10.

In addition, the extension member 150 provided inside the internal manifold 144 also serves as a support member that supports the stacked fuel cells 100. Therefore, as indicated by the dotted line of FIG. 7, it is possible to prevent the fuel cell stack 10 from being bent by its own weight.

Using the fuel cell stack 10 according to the first embodiment described above, it is possible to obtain the following effects.

Since the fuel cell stack 10 has the extension member 150 extending in the stacking direction of the fuel cells 100 while it adjoins the inner wall surface of the anode gas discharge internal manifold 144, the produced water flowing to the inside of the internal manifold 144 smoothly flows along the inner wall surface of the extension member 150. As a result, it is possible to easily discharge the produced water through the extension member 150 and improve produced water discharge performance of the internal manifold 144. In addition, since the extension member 150 is arranged to abut on the inner wall surface of the internal manifold 144, it is possible to position each of the fuel cells 100 when the fuel cell stack 10 is assembled.

It is noted that, although the extension member 150 is formed in a cylindrical member abutting on the inner-wall upper surface, the inner-wall lateral surface, and the inner-wall lower surface of the internal manifold 144 in the first embodiment, the extension member 150 may be formed in a rod shape member abutting on at least one of the inner-wall upper surface, the inner-wall lateral surface, and the inner-wall lower surface of the internal manifold 144. Even when the extension member 150 is formed in such a shape, the produced water attached to the extension member 150 smoothly flows in the stacking direction of the fuel cells 100 along the extension member 150.

Second Embodiment

Next, a description will be made for an extension member 150 according to a second embodiment of this disclosure. The fuel cell stack according to the second embodiment differs from that of the first embodiment in that the extension member 150 is formed of a water-repellent material.

The extension member 150 according to the second embodiment is formed of a high water-repellent resin material such as polytetrafluoroethylene (PTFE). If the extension member 150 is formed of a material having a higher water-repellent property than that of the internal manifold 144 in this manner, it is possible to increase a flowability of the produced water moving along the inner wall surface of the extension member 150.

As a result, it is possible to improve the produced water discharge performance of the anode gas discharge internal manifold 144. In addition, if the surface of the extension member 150 is coated with a high water-repellent material, the coat may be exfoliated due to aging and the like, which may degrade the flowability of the produced water. In contrast, according to this embodiment, since a body of the extension member 150 is formed of PTFE, the water-repellent property of the extension member 150 is not easily degraded even in a long-time use.

Third Embodiment

Next, a description will be made for an extension member 150 according to the third embodiment of this disclosure. The fuel cell stack according to the third embodiment differs from that of the first embodiment in that the extension member 150 is formed of a hydrophilic material.

The extension member 150 according to the third embodiment is formed of a high hydrophilic resin material such as polyethylene terephthalate (PET) or polyphenylene sulfide (PPS). It is noted that the extension member 150 is preferably formed of polyphenylene sulfide (PPS) in terms of heat resistance. If the extension member 150 is formed of a material having a higher hydrophilicity than that of a material of the internal manifold 144 in this manner, the produced water in the vicinity of the inlet port 151 of the extension member 150 is easily guided into the inside of the extension member 150.

As a result, it is possible to increase the amount of the produced water flowing to the inside of the anode gas discharge internal manifold 144 and effectively discharge the produced water. In addition, if the surface of the extension member 150 is coated with a high hydrophilic material, the coat may be exfoliated due to aging and the like, which may degrade produced water guide performance. In contrast, according to this embodiment, since a body of the extension member 150 is formed of PPS and the like, the hydrophilicity of the extension member 150 is not easily degraded even in a long-time use.

Fourth Embodiment

Next, a description will be made for an extension member 150 according to a fourth embodiment. The fuel cell stack according to the fourth embodiment differs from that of the first embodiment in that the extension member 150 is formed of a hydrophilic material and a water-repellent material.

Figure 8:
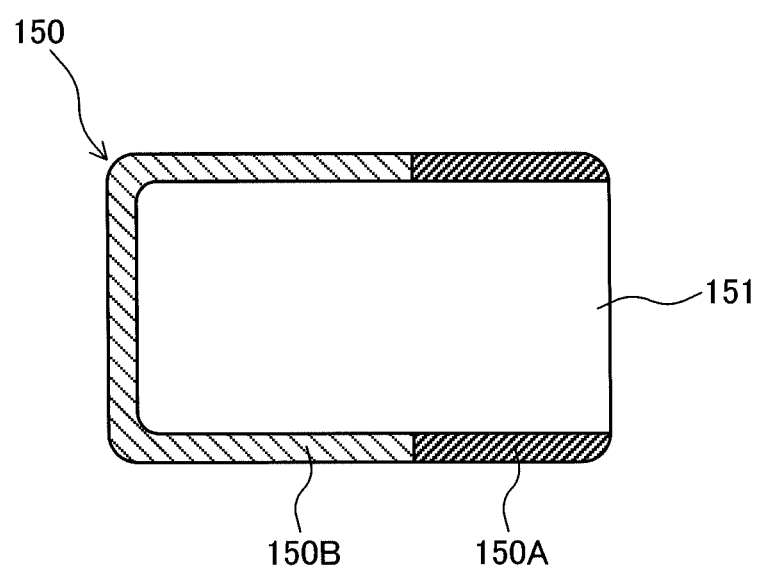
FIG. 8 is a longitudinal cross-sectional view illustrating an extension member provided in the fuel cell stack according to a fourth embodiment.

FIG. 8 is a longitudinal cross-sectional view illustrating the extension member 150 according to the fourth embodiment.

As illustrated in FIG. 8, an inner portion 150A of the extension member 150 in the vicinity of the center of the fuel cells 100 (the vicinity of the inlet port 151) is formed of a material having a higher hydrophilicity, such as PET, than that of the material of the internal manifold 144, and an outer portion 150B of the extension member 150 is formed of a material having a higher water-repellent property, such as PTFE, than that of the material of the internal manifold 144.

If the inner portion 150A of the extension member 150 is formed of a high hydrophilic material in this manner, the produced water in the vicinity of the inlet port 151 is easily guided into the inside of the extension member 150. In addition, if the outer portion 150B of the extension member 150 is formed of a high water-repellent material, it is possible to cause the guided produced water to smoothly flow in the stacking direction of the fuel cells 100. As a result, it is possible to improve produced water discharge performance in the internal manifold 144.

Fifth Embodiment

Next, a description will be made for an extension member 150 according to a fifth embodiment of this disclosure. The fuel cell stack according to the fifth embodiment differs from that of the first embodiment in that the extension member 150 is formed of a hydrophilic material and a water-repellent material.

Figure 9:
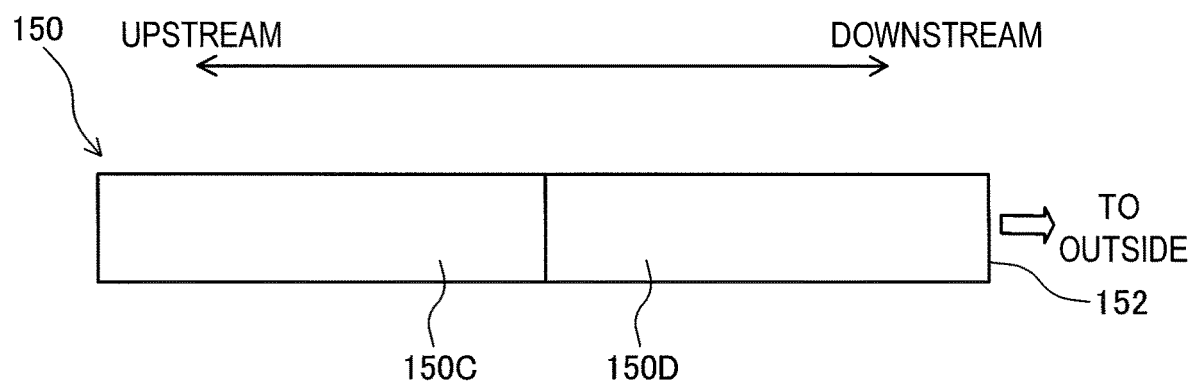
FIG. 9 is a top plan view illustrating an extension member provided in a fuel cell stack according to a fifth embodiment.

FIG. 9 is a top plan view illustrating the extension member 150 according to the fifth embodiment.

As illustrated in FIG. 9, an upstream-side portion 150C of the extension member 150 in the anode gas discharge direction is formed of a material having a higher hydrophilicity, such as PET or PPS, than that of the material of the internal manifold 144, and a downstream-side portion 150D of the extension member 150 in the vicinity of the outlet port 152 is formed of a material having a higher water-repellent property, such as PTFE, than that of the material of the internal manifold 144.

If the upstream-side portion 150C of the extension member 150 is formed a high hydrophilic material, and the downstream-side portion 150D is formed of a high water-repellent material in this manner, it is possible to cause the produced water guided into the upstream side to smoothly flow to the downstream side and improve produced water discharge performance of the internal manifold 144.

It is noted that, although the upstream-side portion 150C of the extension member 150 is formed of a high hydrophilic material, and the downstream-side portion 150D is formed of a high water-repellent material in this embodiment, the material of the extension member 150 may gradually change from a high hydrophilic material to a water-repellent material toward the downstream side.

Sixth Embodiment

Next, a description will be made for an extension member 150 according to a sixth embodiment of this disclosure. The fuel cell stack according to the sixth embodiment differs from those of the first to fifth embodiments in an internal structure of the extension member 150.

Figure 10:
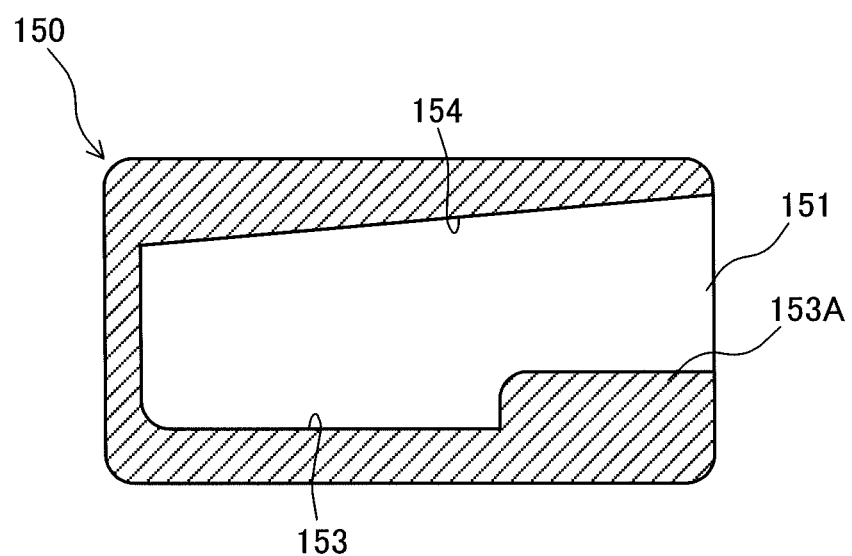
FIG. 10 is a longitudinal cross-sectional view illustrating an extension member provided in a fuel cell stack according to a sixth embodiment.

FIG. 10 is a longitudinal cross-sectional view illustrating the extension member 150 according to the sixth embodiment.

As illustrated in FIG. 10, the inner-wall upper surface 154 of the extension member 150 is formed as a sloping face. The inner-wall upper surface 154 is formed to slope downward from the inner side to the outer side in a direction perpendicular to the stacking direction of the fuel cells 100 (in the width direction of the fuel cell stack 10). If the inner-wall upper surface 154 of the extension member 150 slopes in this manner, it is possible to prevent the produced water attached to the inner-wall upper surface 154 from being guided to an inner depth side of the extension member 150 and flowing backward from the inlet port 151 to the outside.

In addition, the extension member 150 has a protrusion 153A protruding upward from the inner-wall lower surface 153. The protrusion 153A extends along the stacking direction of the fuel cells 100 in the inner portion in the vicinity of the inlet portion 151. The protrusion 153A serves as a bank capable of preventing the produced water flowing on the inner-wall lower surface 153 from leaking to the outside of the extension member 150.

Since the inner-wall upper surface 154 of the extension member 150 according to the sixth embodiment described above is formed to slope and has the protrusion 153A on the inner-wall lower surface 153, it is possible to prevent the produced water flowing into the inside of the extension member 150 once from flowing back to the fuel cell 100 side and stably discharge the produced water to the outside of the fuel cell stack 10.

It is noted that, although the inner-wall upper surface 154 of the extension member 150 slopes downward straightly to the outside according to the sixth embodiment, the invention is limited thereto. The inner-wall upper surface 154 of the extension member 150 may be configured not to easily flow the attached produced water backward to the fuel cell 100 side as illustrated in FIGS. 11A to 11E.

Figure 11A:
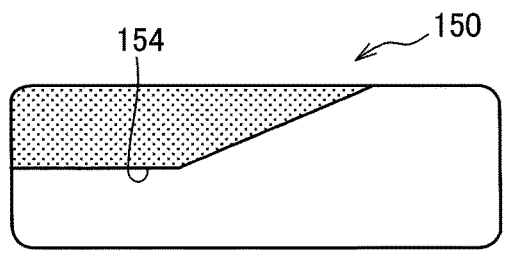
FIG. 11A is a diagram illustrating a modification of an inner-wall upper surface of the extension member.

For example, the inner-wall upper surface 154 of the extension member 150 may have a sloping-down inner portion and a horizontal outer portion as illustrated in FIG. 11A.

Figure 11B:
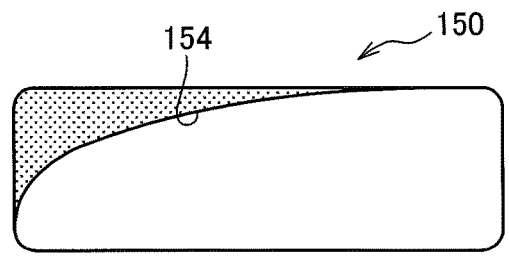
FIG. 11B is a diagram illustrating a modification of the inner-wall upper surface of the extension member.
Figure 11C:
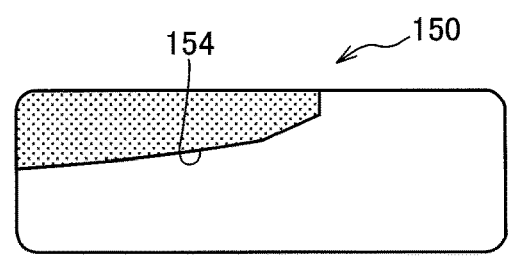
FIG. 11C is a diagram illustrating a modification of the inner-wall upper surface of the extension member.

In addition, the inner-wall upper surface 154 of the extension member 150 may slope down from the inner side to the outer side while it is convex as illustrated in FIG. 11B. Alternatively, the inner-wall upper surface 154 of the extension member 150 may slope down from the inner side to the outer side while it is convex downward as illustrated in FIG. 11C.

Figure 11D:
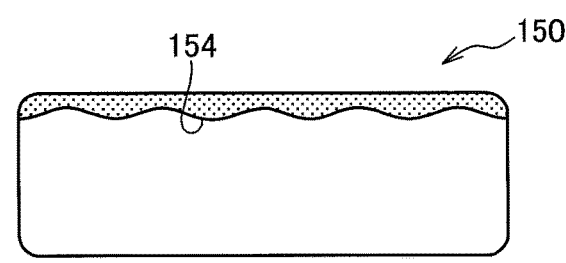
FIG. 11D is a diagram illustrating a modification of the inner-wall upper surface of the extension member.
Figure 11E:
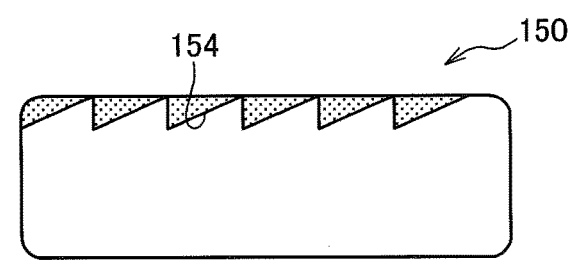
FIG. 11E is a diagram illustrating a modification of the inner-wall upper surface of the extension member.

Alternatively, the inner-wall upper surface 154 of the extension member 150 may be an undulating surface on which smooth undulations are formed continuously from the inner side to the outer side as illustrated in FIG. 11D. Alternatively, the inner-wall upper surface 154 of the extension member 150 may have a saw-tooth shape in which slopes are formed continuously from the inner side to the outer side as illustrated in FIG. 11E.

Figure 12:
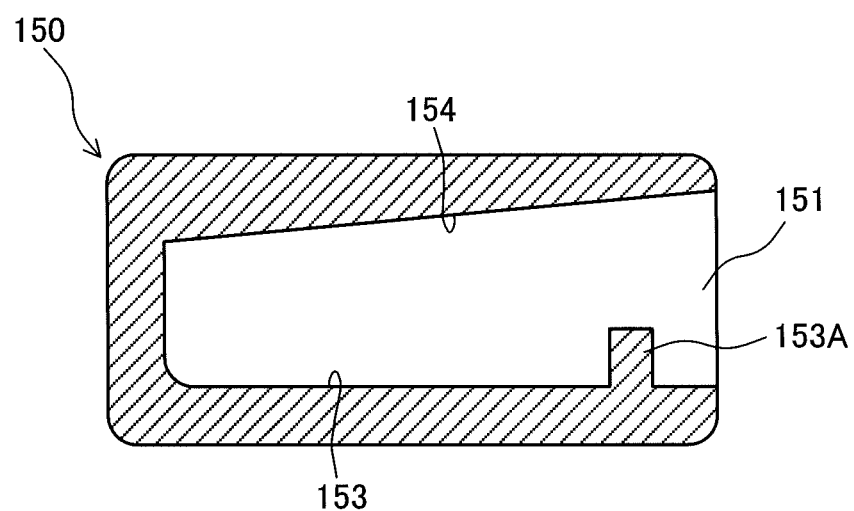
FIG. 12 is a diagram illustrating a modification of a protrusion formed in an inner-wall lower surface of the extension member.

Although the protrusion 153A of the extension member 150 has a relatively large width according to the sixth embodiment as illustrated in FIG. 10, the invention is not limited thereto. The protrusion 153A may be an erected wall that is erected from the inner-wall lower surface 153 in the vicinity of the inlet port 151 and extends in the stacking direction of the fuel cells 100 as illustrated in FIG. 12. Even such an erected wall can also prevent the produced water moving along the inner-wall lower surface 153 from flowing backward to the fuel cell 100 side.

Seventh Embodiment

Next, a description will be made for an extension member 150 according to a seventh embodiment of this disclosure.

The extension member 150 according to the seventh embodiment differs from those of the first to sixth embodiments in its shape.

Figure 13:
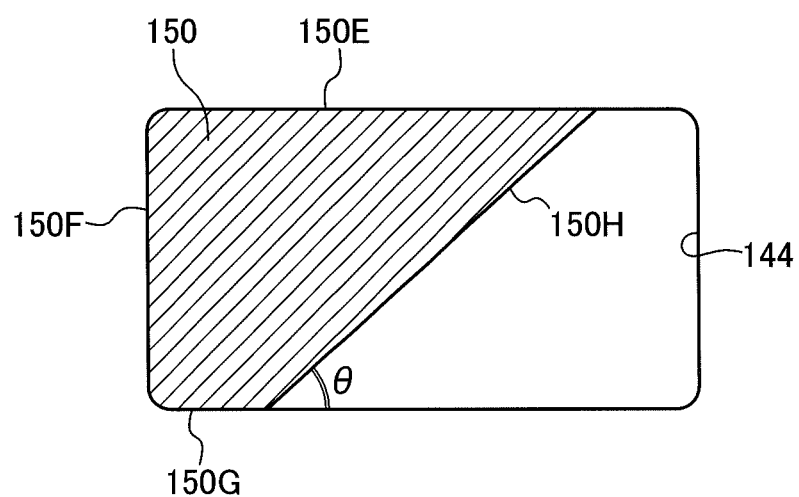
FIG. 13 is a longitudinal cross-sectional view illustrating an extension member provided in a fuel cell stack according to a seventh embodiment.

FIG. 13 is a longitudinal cross-sectional view illustrating the extension member 150 according to the seventh embodiment.

As illustrated in FIG. 13, the extension member 150 is a bar-shaped member having an approximately trapezoidal cross section and is formed of a high hydrophilic resin material.

The extension member 150 is arranged inside the internal manifold 144 such that, out of its outer circumferential surfaces, a surface in the upper side (hereinafter, referred to as an "upper side surface") 150E, a surface in the outer side, located in the left side in the drawing (hereinafter, referred to as an "outer side surface") 150F, and a surface in the lower side (hereinafter, referred to as a "lower side surface") 150G are arranged to abut on the inner-wall upper surface, the inner-wall outer-side surface, and the inner-wall lower surface, respectively, of the internal manifold 144.

In addition, a surface in the inner side (hereinafter, referred to as an "inner side surface") 150H, located in the right side in the drawing, that is, the layered product 111 side of the extension member 150, is formed to slope down from the inner side to the outer side such that an angle θ between the inner side surface 150H and the inner-wall lower surface of the internal manifold 144 forms an acute angle.

Figure 14:
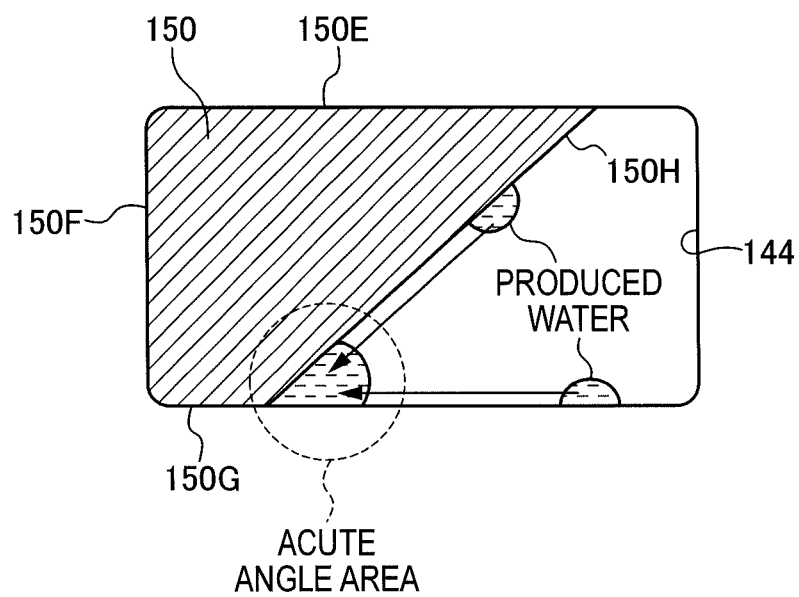
FIG. 14 is a diagram illustrating the effects of the fuel cell stack according to the seventh embodiment.

FIG. 14 is a diagram illustrating the effects of the fuel cell stack 10 according to the seventh embodiment.

According to this embodiment, the extension member 150 is formed of a material having a higher hydrophilicity than that of the material of the internal manifold 144. Furthermore, the inner side surface 150H slopes such that the angle θ between the inner side surface 150H and the inner-wall lower surface of the internal manifold 144 becomes an acute angle.

As a result, it is possible to guide the produced water attached to the inner-wall upper surface of the internal manifold 144 into the inner side surface 150H of the extension member 150 and further into the acute angle area indicated by the dotted line in the drawing using the slope of the inner side surface 150H.

A high hydrophilic member has a property of guiding the produced water into an area relatively narrower than the vicinity. For this reason, if the extension member 150 is formed of a high hydrophilic material, the produced water is guided into an acute angle area which is an area narrower than the vicinity. As a result, in addition to the produced water attached to the inner-wall upper surface of the internal manifold 144, the produced water attached to the inner-wall lower surface of the internal manifold 144 can also be guided into the acute angle area.

For this reason, it is possible to suppress a backflow of the produced water flowing to the inside of the internal manifold 144 and smoothly move the produced water guided into the acute angle area in the stacking direction along the inner side surface 150H.

In addition, since the extension member 150 having a bar shape reduces a volume of the internal manifold 144, it is possible to increase a flow velocity of the anode off-gas flowing through the internal manifold.

As a result, it is possible to more smoothly move the produced water guided into the acute angle area in the stacking direction along the inner side surface 150H.

Furthermore, the extension member 150 has a bar shape, and the extension member 150 is arranged inside the internal manifold 144 such that the upper side surface 150E and the lower side surface 150G abut on the inner-wall upper surface and the inner-wall lower surface, respectively, of the internal manifold 144.

Figure 7:
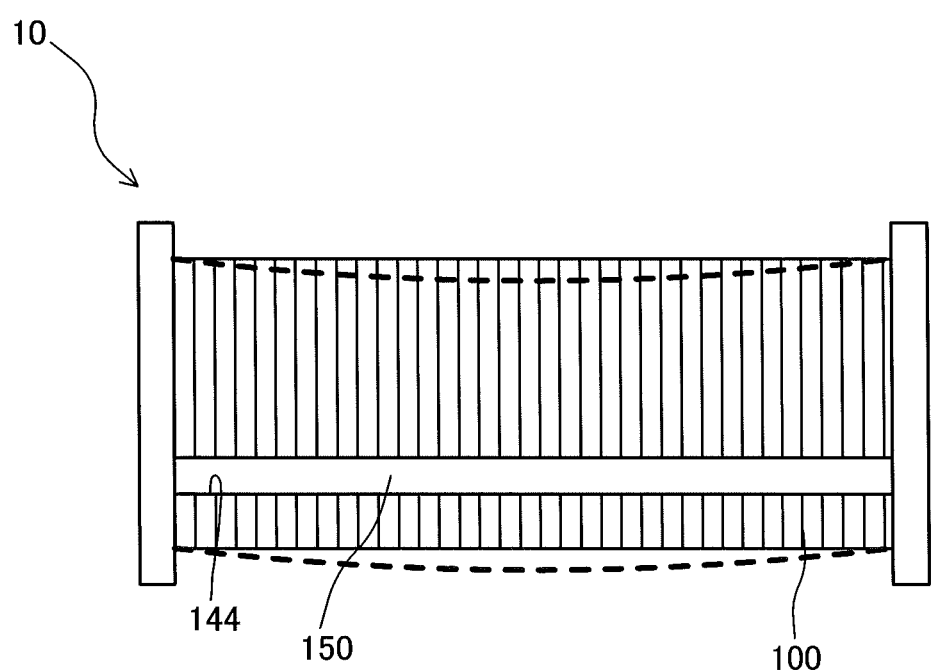
FIG. 7 is a schematic side view illustrating the fuel cell stack.

As a result, compared to the first embodiment in which the extension member 150 is formed of a cylindrical member having an approximately U-shaped cross section, it is possible to more improve a function as a support member for supporting the stacked fuel cells 100 and prevent the fuel cell stack 10 from being bent by its own weight as indicated by the dotted line in FIG. 7.

Eighth Embodiment

Next, a description will be made for an extension member 150 according to an eighth embodiment. The eighth embodiment differs from the seventh embodiment in that a cushioning member 160 is provided between the extension member 150 and the internal manifold 144.

Figure 15:
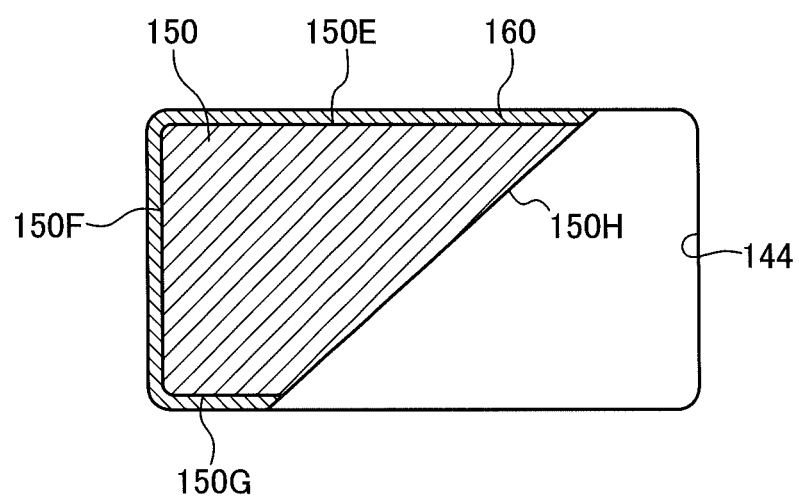
FIG. 15 is a longitudinal cross-sectional view illustrating an extension member and a cushioning member provided in a fuel cell stack according to an eighth embodiment.

FIG. 15 is a longitudinal cross-sectional view illustrating the extension member 150 and the cushioning member 160 according to the eighth embodiment.

As illustrated in FIG. 15, the cushioning member 160 is a cylindrical member having an approximately U-shaped cross section and is formed of an elastic body such as a synthetic rubber including a silicon rubber.

The cushioning member 160 is arranged inside the internal manifold 144 such that its inner circumferential surface abuts on the upper side surface 150E, the outer side surface 150F, and the lower side surface 150G of the extension member 150, and its outer circumferential surface abuts on the inner-wall upper surface, the inner-wall outer side surface, and the inner-wall lower surface of the internal manifold.

During the operation of the fuel cell system 1, an internal temperature of the fuel cell stack 10 increases. A material of the internal manifold 144 differs from a material of the extension member 150, and the material of the extension member 150 has a thermal expansion coefficient higher than that of the internal manifold 144. For this reason, as the extension member 150 expands, a load is applied to the internal manifold 144 from the extension member 150, and this degrades durability of the fuel cell stack 10.

In this regard, if the cushioning member 160 is provided between the extension member 150 and the internal manifold 144 as in this embodiment, it is possible to reduce a load applied to the internal manifold 144 from the extension member 150 and improve durability of the fuel cell stack 10.

It is noted that, although the extension member 150 and the cushioning member 160 are formed separately in this embodiment, they may be formed integratedly. In addition, although the cushioning member 160 is provided across the entire area including the upper side surface 150E, the outer side surface 150F, and the lower side surface 150G of the extension member 150 in this embodiment, the cushioning member 160 may be provided in only a part of the area.

Ninth Embodiment

Next, a description will be made for an extension member 150 according to a ninth embodiment. The ninth embodiment differs from the seventh embodiment in that a sliding member 170 is provided between the extension member 150 and the internal manifold 144.

Figure 16:
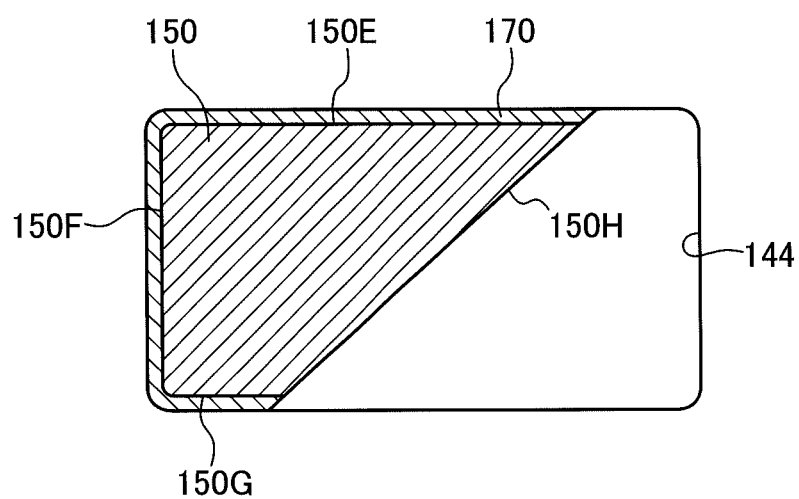
FIG. 16 is a longitudinal cross-sectional view illustrating an extension member and a sliding member provided in a fuel cell stack according to a ninth embodiment.

FIG. 16 is a longitudinal cross-sectional view illustrating the extension member 150 and the sliding member 170 according to the ninth embodiment.

As illustrated in FIG. 16, the sliding member 170 is a cylindrical member having an approximately U-shape and is formed of a resin material and the like including a polyimide. However, the sliding member 170 may be formed of any material without limitation if a low frictional member having a relatively lower friction coefficient is employed.

The sliding member 170 is arranged inside the internal manifold 144 such that its inner circumferential surface abuts on the upper side surface 150E, the outer side surface 150F, and the lower side surface 150G of the extension member 150, and its outer circumferential surface abuts on the inner-wall upper surface, the inner-wall outer side surface, and the inner-wall lower surface of the internal manifold.

If the sliding member 170 is provided in the outer circumferential surface of the extension member 150 in this manner, it is possible to improve assemblability when the extension member 150 is inserted into the internal manifold 150. In addition, it is possible to suppress wearing of components caused by sliding between the extension member 150 and the inner wall surface of the internal manifold 144 during an assembly process and improve durability of the fuel cell stack 10.

It is noted that, although the extension member 150 and the sliding member 170 are formed separately in this embodiment, they may be formed integratedly. In addition, although the sliding member 170 is provided across the entire area of the extension member 150 including the upper side surface 150E, the outer side surface 150F, and the lower side surface 150G in this embodiment, the sliding member 170 may be provided in only a part of the area.

Tenth Embodiment

A description will be made for an extension member 150 according a tenth embodiment of this disclosure. The tenth embodiment differs from the seventh embodiment in that a longitudinal cross-sectional area of the extension member 150 is formed as small as the anode gas outlet port of the fuel cell stack 10.

Hereinafter, the fuel cell stack 10 having the extension member 150 according to the tenth embodiment will be described with reference to FIGS. 17, 18A, and 18B.

Figure 17:
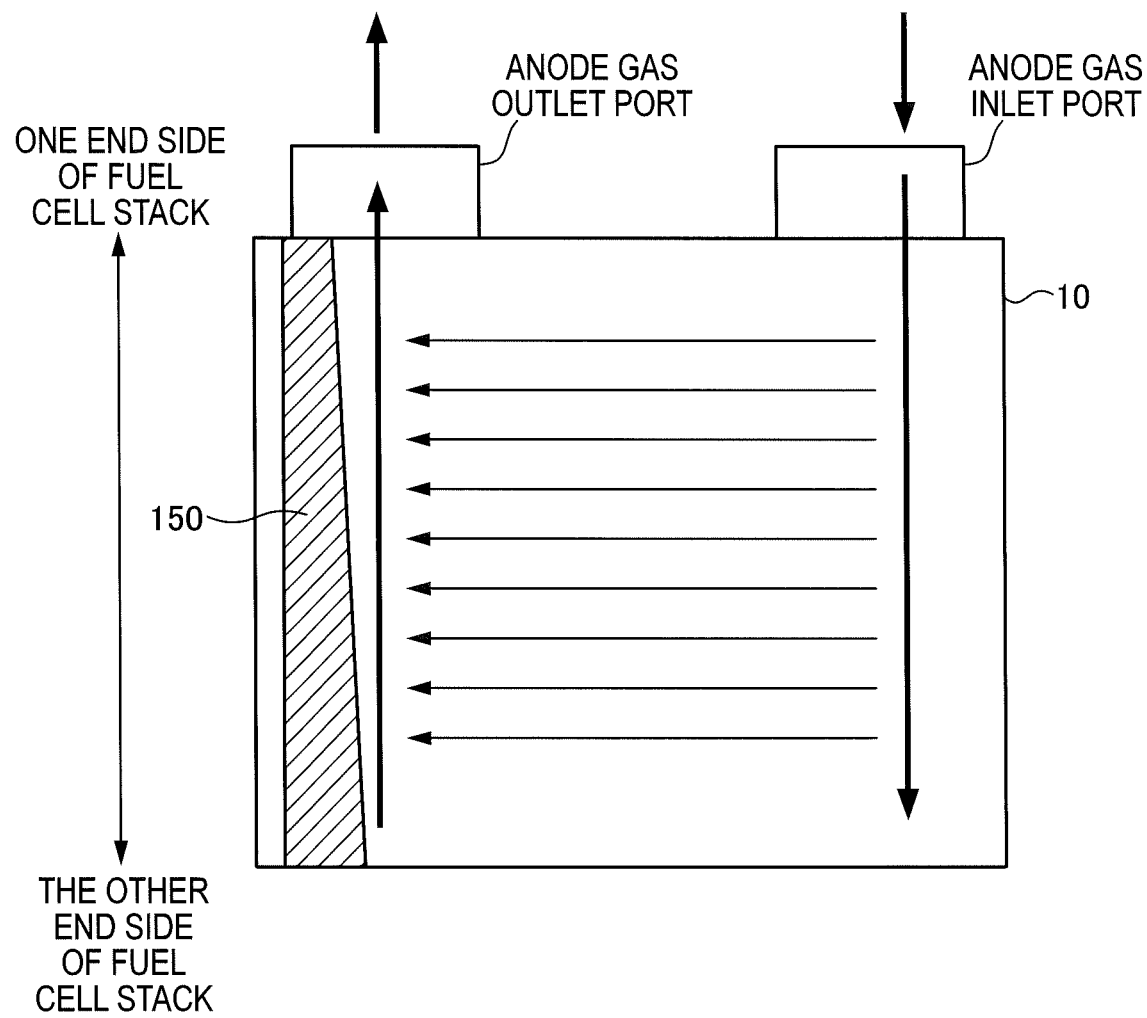
FIG. 17 is a schematic transverse cross-sectional view illustrating a fuel cell stack provided in an extension member according to a tenth embodiment.

FIG. 17 is a schematic transverse cross-sectional view illustrating the fuel cell stack 10 having the extension member 150 according to the tenth embodiment. FIG. 18A is a longitudinal cross-sectional view illustrating the extension member 150 in one end side of the fuel cell stack 10. FIG. 18B is a longitudinal cross-sectional view illustrating the extension member 150 in the other end side of the fuel cell stack 10.

As illustrated in FIG. 17, in the fuel cell stack 10 according to this embodiment, the anode gas inlet port and the anode gas outlet port are formed in one end side of the fuel cell stack 10. In the case of such a fuel cell stack 10, a flow velocity of the anode off-gas flowing through the internal manifold 144 is faster in the one end side (where the anode gas outlet port is formed) than that of the other end side of the fuel cell stack 10.

Figure 18A:
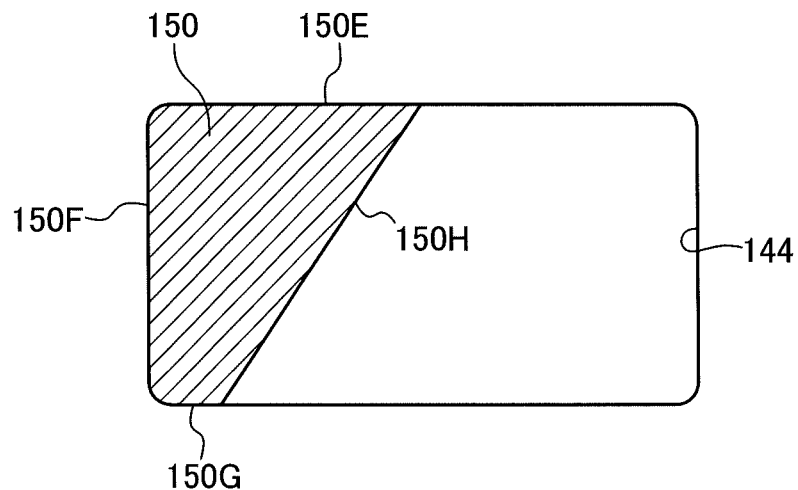
FIG. 18A is a longitudinal cross-sectional view illustrating an extension member provided in the fuel cell stack according to the tenth embodiment.
Figure 18B:
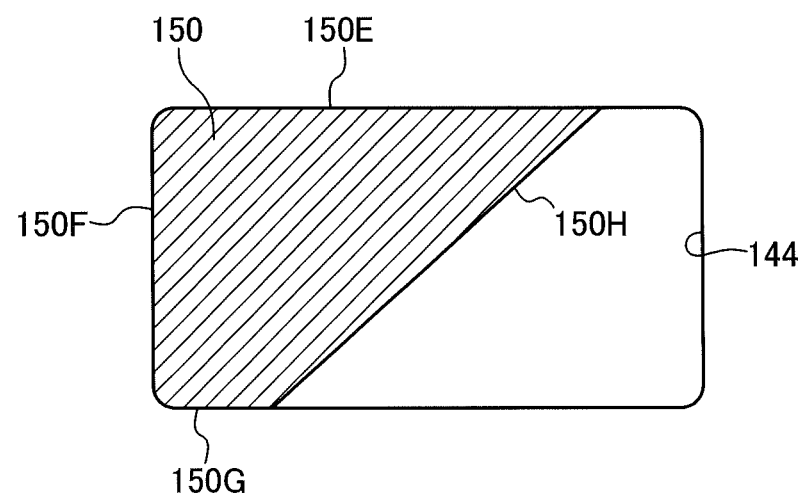
FIG. 18B is a longitudinal cross-sectional view illustrating the extension member provided in the fuel cell stack according to the tenth embodiment.

In this regard, according to the tenth embodiment, the extension member 150 is formed such that an area of the transverse cross section of the extension member 150 is reduced toward the anode gas outlet port of the fuel cell stack 10 as illustrated in FIGS. 18A and 18B. In other words, the extension member 150 according to this embodiment is formed such that a space where the anode off-gas flows in the internal manifold 144 increases toward the anode gas outlet port of the fuel cell stack 10.

As a result, it is possible to equalize the flow velocity of the anode off-gas flowing through the inside of the internal manifold 144 and improve water drainability while equalizing the flow rate of the anode gas flowing to each fuel cell 100.

Figure 19:
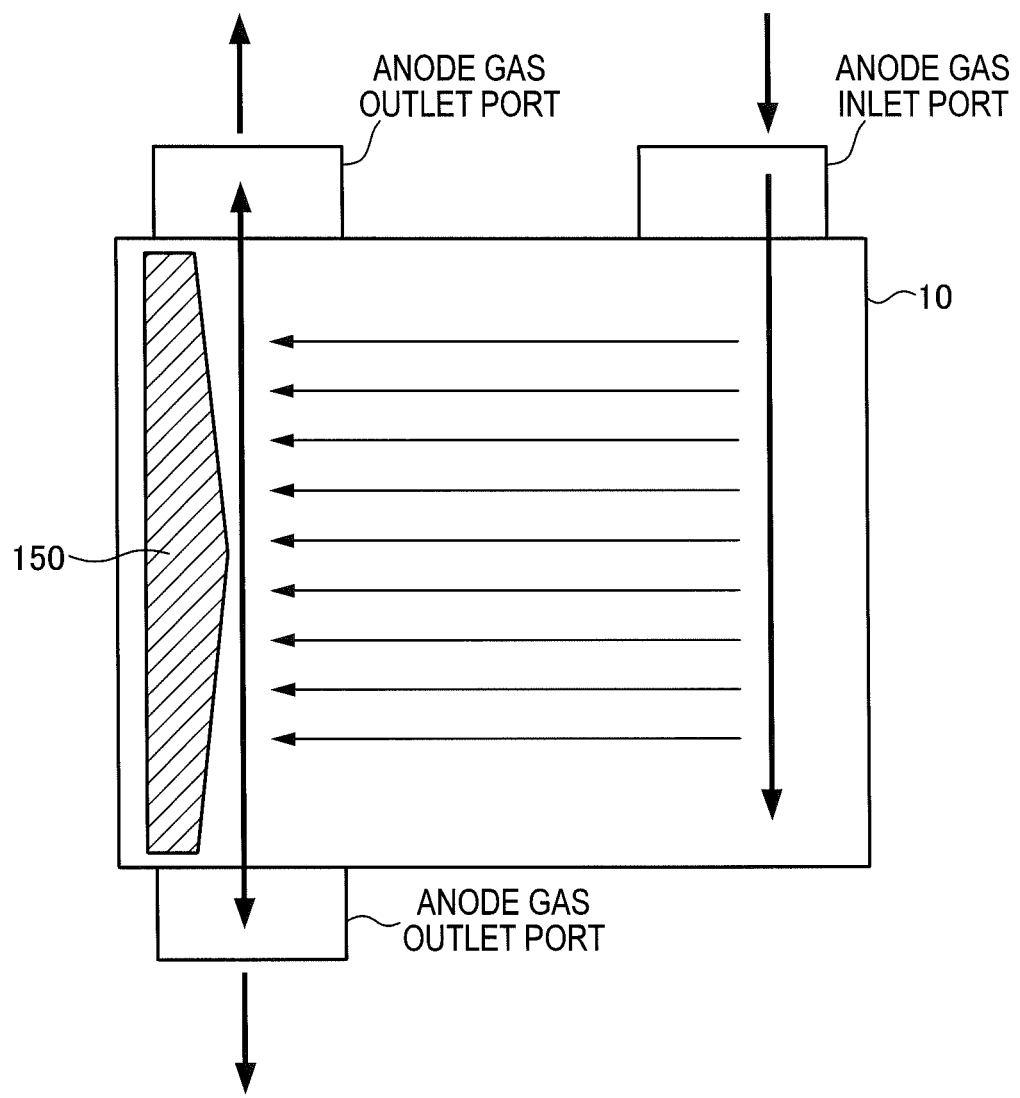
FIG. 19 is a diagram illustrating a modification of the tenth embodiment.

It is noted that, when the anode gas outlet port is formed in both ends of the fuel cell stack 10, it is preferable that the area of the transverse cross section of the extension member 150 positioned in the center of the stacking direction of the fuel cell stack 10 be maximized as illustrated in FIG. 19.

Eleventh Embodiment

Next, a description will be made for an extension member 150 according to the eleventh embodiment of this disclosure. The eleventh embodiment differs from the seventh embodiment in that a protrusion 150I is provided to prevent the extension member 150 from being deviated in a direction perpendicular to the stacking direction in the end of the extension member 150.

Hereinafter, the extension member 150 of the fuel cell stack 10 according to the eleventh embodiment will be described with reference to FIGS. 20 and 21.

Figure 20:
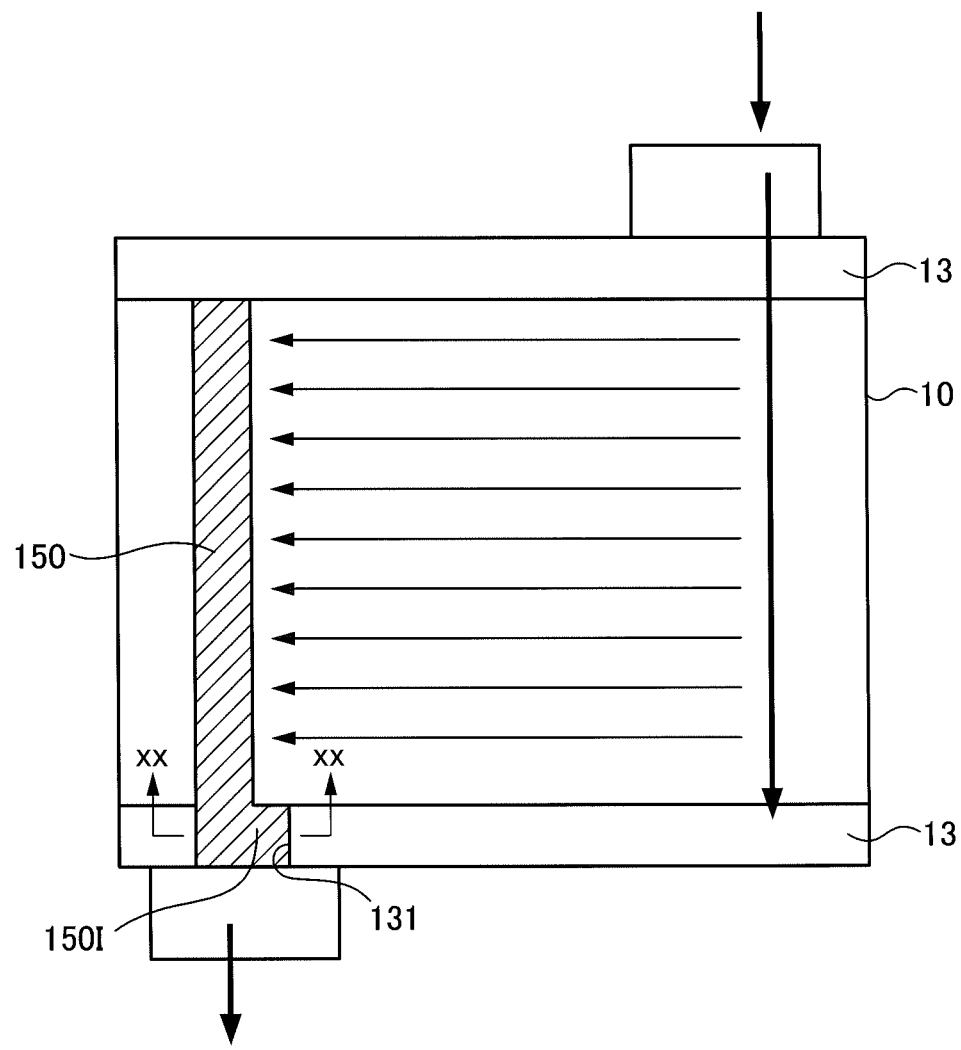
FIG. 20 is a schematic transverse cross-sectional view illustrating a fuel cell stack according to an eleventh embodiment.
Figure 21:
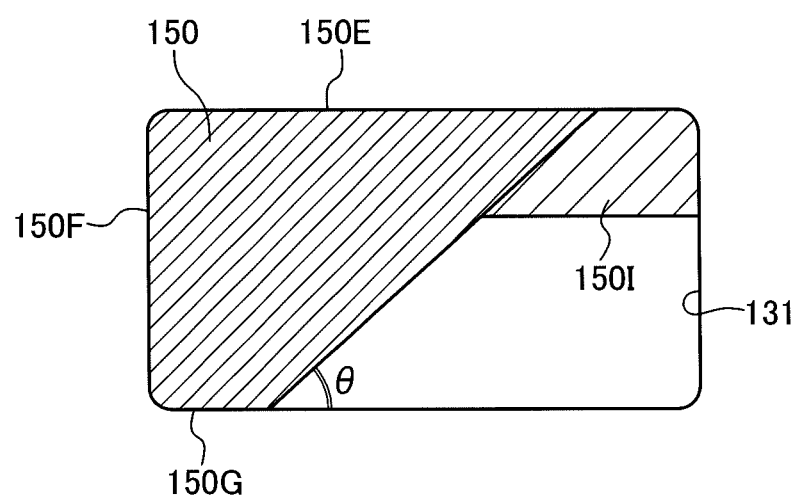
FIG. 21 is a transverse cross-sectional view illustrating the extension member along the line XX-XX of FIG. 20.

FIG. 20 is a schematic transverse cross-sectional view illustrating the fuel cell stack 10. FIG. 21 is a transverse cross-sectional view illustrating the extension member 150 along the line XX-XX of FIG. 20.

As illustrated in FIG. 20, the fuel cell stack 10 is provided with plates 13 for interposing the stacked fuel cells in both ends of the stacking direction. It is noted that the plates 13 are also provided in each of the embodiments described above, but they are not illustrated for simplicity purposes.

The plate 13 has a communicating hole 131 that communicates with the internal manifold 144 and the anode gas outlet port. In addition, according to the eleventh embodiment, the extension member 150 elongates to the communicating hole 131 of the plate 13 as illustrated in FIG. 20, and a protrusion 150I abutting on the inner side surface inside the communicating hole 131 is provided in the extension member 150 as illustrated in FIGS. 20 and 21.

As a result, it is possible to suppress the extension member 150 from being deviated in a direction perpendicular to the stacking direction.

Although various embodiments of this disclosure have been described hereinbefore, they are just for illustrative purposes and are not intended to specifically limit the technical scope of the invention. Instead, it would be appreciated that various changes or modifications may be possible without departing from the spirit and scope of the invention.

Although the extension member 150 is installed inside the anode gas discharge internal manifold 144 in the first to eleventh embodiments, the extension member 150 may be installed inside the cathode gas discharge internal manifold 146 in the same manner. When the extension member 150 is installed in the internal manifolds 144 and 146, it is possible to improve produced water discharge performance in both the internal manifolds 144 and 146 and positioning accuracy of the fuel cells 100.

Although the fuel cell stack 10 having the extension member 150 is applied to an anode non-circulation type fuel cell system in the first to eleventh embodiments, the invention is not limited thereto. The fuel cell stack 10 having the extension member 150 may also be applied to an anode circulation type fuel cell system in which the anode off-gas can circulate to the anode gas supply path 22.

Figure 22:
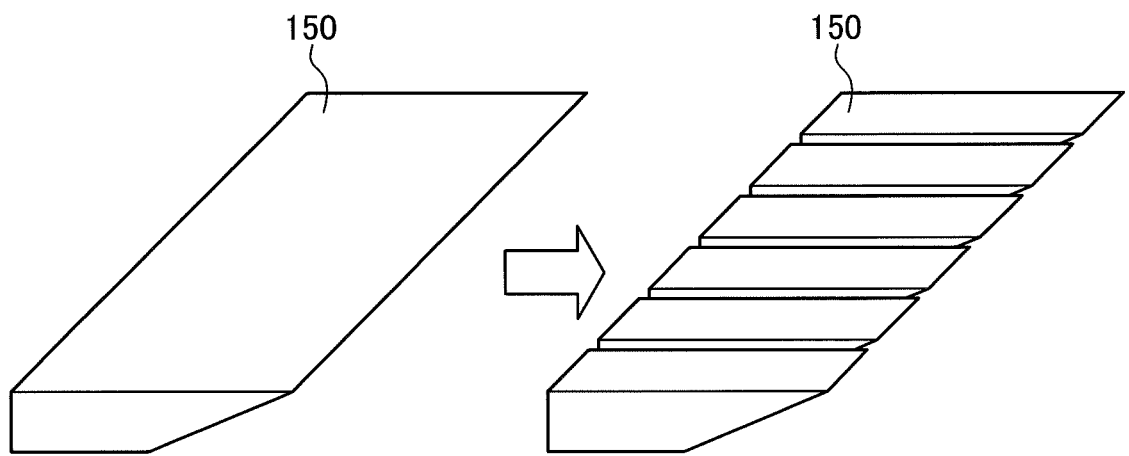
FIG. 22 is a diagram illustrating an extension member according to a modification of the seventh embodiment.

Although the extension member 150 is a single bar-shaped member in the seventh embodiment, the extension member 150 may be divided into a number of pieces smaller than a total number of the fuel cells 100 in order improve assemblability as illustrated in FIG. 22.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A fuel cell stack obtained by stacking a plurality of fuel cells, comprising:
   an internal manifold that extends in a stacking direction of the fuel cells to externally discharge a gas used in the fuel cell; and
   an extension member that adjoins an inner wall surface of the internal manifold and extends in the stacking direction,
   wherein the extension member is a bar-shaped member provided in an opposite side to a side where a gas from the fuel cells flows to the inside of the internal manifold and has a straight sloping surface formed to slope down within a plane perpendicular to the stacking direction of the plurality of fuel cells, the sloping surface making an acute angle with an inner-wall lower surface of the internal manifold, and has an upper side surface, an outer side surface and a lower side surface arranged to abut an inner-wall upper surface, an inner-wall outer-side surface and an inner-wall lower surface, respectively, of the internal manifold, and
   wherein the straight sloping surface slopes down continuously from the upper side surface to the lower side surface within the plane perpendicular to the stacking direction of the plurality of fuel cells.

2. The fuel cell stack according to claim 1, wherein the extension member has a cushioning member in a portion adjoining an inner wall surface of the internal manifold.

3. The fuel cell stack according to claim 1, wherein the extension member has a low frictional member in a portion adjoining an inner wall surface of the internal manifold.

4. The fuel cell stack according to claim 1, wherein a ratio occupied by the extension member inside the internal manifold is reduced toward an outlet port of the internal manifold.

5. The fuel cell stack according to claim 1, further comprising:
   a plate having a communicating hole that is provided in an outer side in the stacking direction of the fuel cells and communicates with the internal manifold,
   wherein the extension member extends to the communicating hole of the plate, and a deviation suppressing portion that suppresses the extension member from being deviated in the direction perpendicular to the stacking direction is provided inside the communicating hole of the plate.

6. The fuel cell stack according to claim 1, wherein the extension member is provided in each of an internal manifold for externally discharging an anode gas and an internal manifold for externally discharging a cathode gas.

* * * * *